(12) United States Patent
Kwon et al.

(10) Patent No.: US 12,237,538 B2
(45) Date of Patent: Feb. 25, 2025

(54) SEPARATOR FOR SECONDARY BATTERY AND SECONDARY BATTERY INCLUDING THE SAME

(71) Applicant: LG ENERGY SOLUTION, LTD., Seoul (KR)

(72) Inventors: Hye-Jin Kwon, Daejeon (KR); Su-Jin Yoon, Daejeon (KR); Jong-Heon Kwak, Daejeon (KR); Jeong-Ae Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 533 days.

(21) Appl. No.: 17/625,052

(22) PCT Filed: Jul. 6, 2020

(86) PCT No.: PCT/KR2020/008809
§ 371 (c)(1),
(2) Date: Jan. 5, 2022

(87) PCT Pub. No.: WO2021/006583
PCT Pub. Date: Jan. 14, 2021

(65) Prior Publication Data
US 2022/0285791 A1   Sep. 8, 2022

(30) Foreign Application Priority Data

Jul. 8, 2019  (KR) .................. 10-2019-0082290

(51) Int. Cl.
*H01M 50/451* (2021.01)
*H01M 50/403* (2021.01)
*H01M 50/417* (2021.01)
*H01M 50/431* (2021.01)

(52) U.S. Cl.
CPC ....... *H01M 50/451* (2021.01); *H01M 50/403* (2021.01); *H01M 50/417* (2021.01); *H01M 50/431* (2021.01)

(58) Field of Classification Search
CPC .......... H01M 10/0525; H01M 50/403; H01M 50/414; H01M 50/417; H01M 50/431; H01M 50/443; H01M 50/446; H01M 50/449; H01M 50/451; H01M 50/489; Y02E 60/10; Y02P 70/50
See application file for complete search history.

(56) References Cited

U.S. PATENT DOCUMENTS

| | | |
|---|---|---|
| 2010/0316903 A1 | 12/2010 | Kim et al. |
| 2011/0135989 A1 | 6/2011 | Noumi et al. |
| 2013/0199030 A1 | 8/2013 | Song et al. |
| 2014/0186680 A1 | 7/2014 | Kim et al. |
| 2015/0037652 A1 | 2/2015 | Kim et al. |
| 2016/0190536 A1 | 6/2016 | Park et al. |
| 2016/0285063 A1 | 9/2016 | Yang et al. |
| 2018/0212219 A1 | 7/2018 | Kim et al. |
| 2019/0237732 A1 | 8/2019 | Hu et al. |
| 2020/0373538 A1 | 11/2020 | Kim et al. |

FOREIGN PATENT DOCUMENTS

| | | |
|---|---|---|
| EP | 3 937 274 A1 | 1/2022 |
| JP | 2009-266812 A | 11/2009 |
| KR | 10-2009-0056811 A | 6/2009 |
| KR | 10-2013-0091174 A | 8/2013 |
| KR | 10-1363113 B1 | 2/2014 |
| KR | 10-2014-0044757 A | 4/2014 |
| KR | 10-2014-0139357 A | 12/2014 |
| KR | 10-1474591 B1 | 12/2014 |
| KR | 10-2015-0084116 A | 7/2015 |
| KR | 10-1618681 B1 | 5/2016 |
| KR | 10-2017-0083283 A | 7/2017 |
| KR | 10-2018-0000605 A | 1/2018 |
| KR | 10-2019-0006586 A | 1/2019 |
| KR | 10-2019-0022125 A | 3/2019 |
| KR | 10-2019-0042576 A | 4/2019 |
| KR | 10-2019-0067397 A | 6/2019 |
| WO | WO 2018/038510 A1 | 3/2018 |

OTHER PUBLICATIONS

International Search Report, issued in PCT/KR2020/008809, mailed Oct. 28, 2020.
European Patent Office Search Report dated Jul. 29, 2022 for European Patent Application No. 20837144.3.

*Primary Examiner* — Victoria H Lynch
(74) *Attorney, Agent, or Firm* — Birch, Stewart, Kolasch & Birch, LLP

(57) ABSTRACT

A separator for a secondary battery, including: a porous polymer substrate having a plurality of pores; and a porous coating layer on at least one surface of the porous polymer substrate, the porous coating layer including a plurality of inorganic particles, a binder polymer and a urethane bond-containing crosslinked polymer. The binder polymer and the urethane bond-containing crosslinked polymer are on at least a part of the surface of the inorganic particles to connect and fix the inorganic particles with one another. The urethane bond-containing crosslinked polymer has a weight average molecular weight of 100,000-5,000,000, and the urethane bond-containing crosslinked polymer is present in an amount of 6 parts by weight to 60 parts by weight based on 100 parts by weight of the total weight of the binder polymer and the urethane bond-containing crosslinked polymer.

14 Claims, No Drawings

SEPARATOR FOR SECONDARY BATTERY AND SECONDARY BATTERY INCLUDING THE SAME

TECHNICAL FIELD

The present disclosure relates to a separator for a secondary battery and a secondary battery including the same. Particularly, the present disclosure relates to a separator for a secondary battery which has improved heat resistance and shows improved adhesion to an electrode, and a secondary battery including the same.

The present application claims priority to Korean Patent Application No. 10-2019-0082290 filed on Jul. 8, 2019 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte. However, such lithium ion batteries have a safety-related problem, such as ignition and explosion, caused by the use of an organic electrolyte and requires a complicated manufacturing process undesirably.

More recently, lithium ion polymer batteries have improved the above-mentioned disadvantages of lithium ion batteries, and thus have been regarded as one of the next-generation batteries. However, such lithium ion polymer batteries have relatively lower capacity as compared to lithium ion batteries, and particularly show insufficient discharge capacity at low temperature. Therefore, there is an imminent need for solving the above-mentioned problem.

Although such secondary batteries have been produced from many production companies, safety characteristics thereof show different signs. Evaluation and securement of safety of such secondary batteries are very important. The most important consideration is that secondary batteries should not damage users upon their malfunction. For this purpose, safety standards strictly control ignition and smoke emission in secondary batteries. With regard to safety characteristics of secondary batteries, there is great concern about explosion when a secondary battery is overheated to cause thermal runaway or perforation of a separator. Particularly, a polyolefin-based porous polymer substrate used conventionally as a separator for a secondary battery shows a severe heat shrinking behavior at a temperature of 100° C. or higher due to its material property and a characteristic during its manufacturing process, including orientation, thereby causing a short-circuit between a positive electrode and an negative electrode.

To solve the above-mentioned safety problem of secondary batteries, there has been suggested a separator having a porous organic-inorganic coating layer by coating a mixture of an excessive amount of inorganic particles with a binder polymer on at least one surface of a porous polymer substrate having a plurality of pores.

However, in the case of such a separator, introduction of the porous organic-inorganic coating layer causes the problems, including an increase in resistance of the separator and degradation of adhesion to an electrode. Therefore, there is a need for solving the above-mentioned problems.

DISCLOSURE

Technical Problem

The present disclosure is directed to providing a separator for a secondary battery which has improved adhesion to an electrode and shows excellent heat resistance.

The present disclosure is also directed to providing a secondary battery provided with the separator.

Technical Solution

In one aspect of the present disclosure, there is provided a separator for a secondary battery according to any one of the following embodiments.

According to the first embodiment of the present disclosure, there is provided a separator for a secondary battery, including:

a porous polymer substrate having a plurality of pores; and a porous coating layer on at least one surface of the porous polymer substrate, the porous coating layer including a plurality of inorganic particles, a binder polymer and a urethane bond-containing crosslinked polymer, wherein the binder polymer and the urethane bond-containing crosslinked polymer are on at least a part of the surface of the inorganic particles to connect and fix the inorganic particles with one another, the urethane bond-containing crosslinked polymer has a weight average molecular weight of 100,000-5,000,000, and the urethane bond-containing crosslinked polymer is present in an amount of 6 parts by weight to 60 parts by weight based on 100 parts by weight of the total weight of the binder polymer and the urethane bond-containing crosslinked polymer.

According to the second embodiment of the present disclosure, there is provided the separator for a secondary battery as defined in the first embodiment, wherein the urethane bond-containing crosslinked polymer has a weight average molecular weight of 200,000-4,000,000.

According to the third embodiment of the present disclosure, there is provided the separator for a secondary battery as defined in the first or the second embodiment, wherein the urethane bond-containing crosslinked polymer is present in an amount of 9 parts by weight to 55 parts by weight based on 100 parts by weight of the total weight of the binder polymer and the urethane bond-containing crosslinked polymer.

According to the fourth embodiment of the present disclosure, there is provided the separator for a secondary battery as defined in any one of the first to the third embodiments, wherein the separator has a heat shrinkage of 35% or less.

According to the fifth embodiment of the present disclosure, there is provided the separator for a secondary battery as defined in any one of the first to the fourth embodiments, wherein the urethane bond-containing crosslinked polymer is obtained by a crosslinking reaction of at least one crosslinkable polymer during activation of the secondary battery.

According to the sixth embodiment of the present disclosure, there is provided the separator for a secondary battery as defined in any one of the first to the fifth embodiments, wherein the porous polymer substrate is a polyolefin-based porous polymer substrate.

According to the seventh embodiment of the present disclosure, there is provided the separator for a secondary battery as defined in any one of the first to the sixth embodiments, wherein the binder polymer is polyvinylidene fluoride-co-hexafluoropropylene, polyvinylidene fluoride-co-trichloroethylene, polymethyl methacrylate, polybutyl acrylate, polybutyl methacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, or a mixture of two or more of them.

According to the eighth embodiment of the present disclosure, there is provided the separator for a secondary battery as defined in any one of the first to the seventh embodiments, wherein the inorganic particles are inorganic particles having a dielectric constant of 5 or more, inorganic particles having lithium ion transportability, or a mixture thereof.

In another aspect of the present disclosure, there is provided a secondary battery according to the following embodiment.

According to the ninth embodiment of the present disclosure, there is provided a secondary battery including a cathode, an anode and a separator interposed between the cathode and the anode, wherein the separator is the same as defined in any one of the first to the eight embodiments.

In still another aspect of the present disclosure, there is provided a method for manufacturing a secondary battery according to any one of the following embodiments.

According to the tenth embodiment of the present disclosure, there is provided a method for manufacturing a secondary battery provided with the separator as defined in the first embodiment, including the steps of:

preparing a slurry including a plurality of inorganic particles, a binder polymer, a crosslinkable polymer and a dispersion medium;

applying the slurry onto at least one surface of a porous polymer substrate to prepare a preliminary separator having a porous coating layer;

stacking an electrode including a current collector and an electrode layer on at least one surface of the current collector on the top surface of the porous coating layer of the preliminary separator, wherein the electrode layer faces the porous coating layer to prepare a preliminary separator-electrode composite;

preparing a secondary battery including the preliminary separator-electrode composite; and activating the secondary battery, wherein the crosslinkable polymer of the porous coating layer is crosslinked in the step of activating the secondary battery to obtain an urethane bond-containing crosslinked polymer.

According to the eleventh embodiment of the present disclosure, there is provided the method for manufacturing a secondary battery as defined in the tenth embodiment, wherein the crosslinkable polymer includes polyvinylidene fluoride-chlorotrifluoroethylene-graft-(methyl methacrylate-2-isocyanatoethyl acrylate), polyvinylidene fluoride-graft-(methyl methacrylate-2-isocyanatoethyl acrylate), polyvinylidene fluoride-chlorotrifluoroethylene-graft-(2-isocyanatoethyl acrylate), polyvinylidene fluoride-graft-(methyl acrylate-2-isocyanatoethyl acrylate), polyvinylidene fluoride-chlorotrifluoroethylene-graft-(methyl acrylate-2-isocyanatoethyl acrylate), or a mixture of two or more of them; and ethyl acrylate-acrylonitrile-dimethyl acrylamide-acrylic acid-4-hydroxybutyl acrylate copolymer, methyl acrylate-acrylonitrile-dimethylacrylamide-acrylic acid-4-hydroxybutyl acrylate copolymer, ethyl acrylate-acrylonitrile-acrylic acid-4-hydroxybutyl acrylate copolymer, ethyl acrylate-acrylonitrile-dimethylacrylamide-4-hydroxybutyl acrylate copolymer, ethyl acrylate-dimethylacrylamide-acrylic acid-4-hydroxybutyl acrylate copolymer, ethyl acrylate-acrylic acid-4-hydroxybutylacrylate copolymer, ethyl acrylate-4-hydroxybutyl acrylate copolymer, methyl acrylate-acrylonitrile-acrylic acid-4-hydroxybutyl acrylate copolymer, methyl acrylate-acrylonitrile-dimethyl acrylamide-4-hydroxybutyl acrylate copolymer, methyl acrylate-dimethyl acrylamide-acrylic acid-4-hydroxybutyl acrylate copolymer, methyl acrylate-acrylic acid-4-hydroxybutyl acrylate copolymer, methyl acrylate-4-hydroxybutyl acrylate copolymer, or a mixture of two or more of them.

According to the twelfth embodiment of the present disclosure, there is provided the method for manufacturing a secondary battery as defined in the tenth or the eleventh embodiment, wherein the crosslinkable polymer includes polyvinylidene fluoride-chlorotrifluoroethylene-graft-(methyl methacrylate-2-isocyanatoethyl acrylate) and ethyl acrylate-acrylonitrile-dimethyl acrylamide-acrylic acid-4-hydroxybutyl acrylate copolymer.

According to the thirteenth embodiment of the present disclosure, there is provided the method for manufacturing a secondary battery as defined in any one of the tenth to the twelfth embodiments, wherein the step of activating the secondary battery includes an initial charging step and a high-temperature aging step.

According to the fourteenth embodiment of the present disclosure, there is provided the method for manufacturing a secondary battery as defined in any one of the tenth to the thirteenth embodiments, wherein the high-temperature aging step is carried out at a temperature of 50° C. or higher.

According to the fifteenth embodiment of the present disclosure, there is provided the method for manufacturing a secondary battery as defined in any one of the tenth to the fourteenth embodiments, which further includes a room temperature-aging step carried out at a temperature of 20-40° C. between the initial charging step and the high-temperature aging step.

Advantageous Effects

According to an embodiment of the present disclosure, the binder polymer and the crosslinkable polymer present in the porous coating layer of the separator are adhered to the active material layer of an electrode with ease before the crosslinking is carried out, and thus the adhesion between the electrode and the separator may be improved. On the contrary, when the crosslinked polymer is incorporated directly to the porous coating layer upon the formation thereof according to the related art, the crosslinked polymer has rigid property and lower adhesive property as compared to the crosslinkable polymer according to an embodiment of the present disclosure, and thus the adhesion to the active material layer of the electrode cannot be realized sufficiently.

Since the crosslinked polymer contained in the porous coating layer of the separator of the present invention is obtained through the crosslinking of at least one crosslinkable polymer contained in the porous coating layer during the activation step of the secondary battery, there is no need for an additional step after coating the polymer (crosslinkable polymer) capable of crosslinking. On the contrary, the coating layer including a crosslinked polymer according to the related art is mostly formed by applying slurry containing the crosslinkable polymer onto at least one surface of a porous polymer substrate and carrying out an additional step (heat treatment, UV irradiation, etc.) to allow crosslinking of the crosslinkable polymer. However, according to an embodiment of the present disclosure, the crosslinkable polymer may be crosslinked during the activation step carried out in a process for manufacturing a battery without any additional step for such crosslinking.

In addition, since a crosslinkable polymer is used instead of monomers generally used as a starting material for preparing a crosslinked polymer, it is possible to prevent dissolution of monomers in a porous coating layer, while crosslinking is carried out in an electrolyte during the activation step.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect, there is provided a separator for a secondary battery, including a porous polymer substrate having a plurality of pores, and a porous coating layer positioned on at least one surface of the porous polymer substrate and including a plurality of inorganic particles, a binder polymer and a urethane bond-containing crosslinked polymer, wherein the binder polymer and the urethane bond-containing crosslinked polymer are positioned on the whole or a part of the surface of the inorganic particles to connect the inorganic particles with one another and fix them, the urethane bond-containing crosslinked polymer has a weight average molecular weight of 100,000-5,000,000, and the crosslinked polymer is used in an amount of 6-60 parts by weight based on 100 parts by weight of the total weight of the binder polymer and the crosslinked polymer.

According to the related art, in order to improve the safety of a secondary battery, a separator is coated with an inorganic material to improve the heat resistance of the separator, wherein a highly heat resistant binder is used to further improve the heat resistance upon coating. Herein, when using a crosslinked polymer as a highly heat resistant binder, an additional crosslinking step is required to cause an increase in processing cost, and the coating layer formed on the separator after crosslinking is hardened to cause a problem of a decrease in adhesion to an electrode during the subsequent process of assembling an electrode assembly.

To solve the above-mentioned problem, according to the present disclosure, a separator is manufactured, wherein a crosslinked polymer is not incorporated in advance to the porous coating layer of a separator but a crosslinkable polymer is incorporated to the porous coating layer, and then an electrode assembly is formed so that the crosslinkable polymer may be crosslinked completely during an activation step (e.g. 60° C., 12 hours) after assembling a secondary battery. Herein, a crosslinkable polymer having an urethane crosslinking bond capable of reacting at a low temperature condition may be used to perform crosslinking completely during the activation step. In addition, a crosslinkable polymer, not a crosslinkable monomer, is used so that the porous coating layer may not be dissolved in an electrolyte before crosslinking.

Particularly, the porous polymer substrate may be a porous polymer film substrate or porous polymer nonwoven web substrate.

The porous polymer film substrate may be a porous polymer film including polyolefin, such as polyethylene or polypropylene. For example, such a polyolefin porous polymer film substrate may realize a shut-down function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

In addition, there is no particular limitation in the thickness of the porous polymer film substrate, the porous polymer film substrate may have a thickness of 1-100 μm, particularly 5-50 μm. Although there is no particular limitation in the size of the pores present in the porous polymer film substrate and porosity, the pore size and porosity may be 0.01-50 μm and 10-95%, respectively.

In the separator according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with one another, and thus contributes to prevention of degradation of mechanical properties of a separator having a porous coating layer.

As used herein, the term 'binder polymer' means a non-crosslinked polymer, not a crosslinked polymer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polybutyl acrylate, polybutyl methacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, or the like.

According to an embodiment of the present disclosure, the binder polymer may be classified into a dispersant binder polymer and a non-dispersant binder polymer. The dispersant binder polymer is a polymer having at least one dispersion-contributing functional group at the backbone or side chain thereof, wherein the dispersion-contributing functional group may include an OH group, CN group, or the like. Particular examples of the dispersant binder polymer include cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, or the like. Particular examples of the non-dispersant binder polymer include the above-listed examples of the binder polymer except the examples of the dispersant binder polymer.

According to an embodiment of the present disclosure, the dispersant binder polymer and the non-dispersant binder polymer may be used at the same time as binder polymers, or any one of them may be used alone. When using the dispersant binder polymer and the non-dispersant binder polymer as binder polymers, the weight ratio of the dispersant binder polymer:non-dispersant binder polymer may be 1:1.5-1:20, or 1:2-1:15.

When the above-defined weight ratio is satisfied, slurry dispersibility is stabilized and adhesion to an electrode after coating may be ensured.

The urethane bond-containing crosslinked polymer may be obtained through an urethane crosslinking reaction of a crosslinkable polymer containing an urethane reactive functional group, such as a hydroxyl group (—OH), isocyanate group (—NCO) or both.

According to an embodiment of the present disclosure, the crosslinkable polymer may include a polyvinylidene-based polymer containing a hydroxyl group (—OH), isocyanate group (—NCO) or both; a polyacrylic polymer containing a hydroxyl group (—OH), isocyanate group (—NCO) or both; or two or more of them. In addition, the polyvinylidene-based polymer may be polyvinylidene or a polyvinylidene copolymer (e.g. PVDF-CTFE, PVDF-HFP, PVDF-TFE, etc.) further containing repeating units derived from monomers containing a hydroxyl group (—OH), isocyanate group (—NCO) or both. Herein, the copolymer may be provided in the form of a copolymer having different repeating units linked to the backbone, or a graft copolymer having different repeating units linked to side chains. The monomers containing a hydroxyl group (—OH), isocyanate group (—NCO) or both may include an isocyanate group-containing alkyl (meth)acrylate, or the like. The repeating units to be grafted may further include repeating units containing no OH group and NCO group, besides the monomers containing a hydroxyl group (—OH), isocyanate group (—NCO) or both. Particular examples of the polyvinylidene-based polymer as a crosslinkable polymer may include polyvinylidene fluoride-chlorotrifluoroethylene (PVDF-CTFE)-graft-(methyl methacrylate-2-isocyanatoethyl acrylate), polyvinylidene fluoride-graft-(methyl methacrylate-2-isocyanatoethyl acrylate), polyvinylidene fluoride-chlorotrifluoroethylene-graft-(2-isocyanatoethyl acrylate), polyvinylidene fluoride-graft-(methyl acrylate-2-isocyanatoethyl acrylate), polyvinylidene fluoride-chlorotrifluoroethylene-graft-(methyl acrylate-2-isocyanatoethyl acrylate), or the like.

The polyacrylic polymer containing a hydroxyl group (—OH), isocyanate group (—NCO) or both may be a homopolymer of acrylic monomers containing an OH group, NCO group or both, or a copolymer including acrylic monomer-derived repeating units containing an OH group, NCO group or both and one or more repeating units derived from another monomers not containing such substituents. Particular examples of the polyacrylic polymer may include ethyl acrylate-acrylonitrile-dimethyl acrylamide-acrylic acid-4-hydroxybutyl acrylate copolymer, methyl acrylate-acrylonitrile-dimethyl acrylamide-acrylic acid-4-hydroxybutyl acrylate copolymer, ethyl acrylate-acrylonitrile-acrylic acid-4-hydroxybutyl acrylate copolymer, ethyl acrylate-acrylonitrile-dimethyl acrylamide-4-hydroxybutyl acrylate copolymer, ethyl acrylate-dimethyl acrylamide-acrylic acid-4-hydroxybutyl acrylate copolymer, ethyl acrylate-acrylic acid-4-hydroxybutyl acrylate copolymer, ethyl acrylate-4-hydroxybutyl acrylate copolymer, methyl acrylate-acrylonitrile-acrylic acid-4-hydroxybutyl acrylate copolymer, methyl acrylate-acrylonitrile-dimethyl acrylamide-4-hydroxybutyl acrylate copolymer, methyl acrylate-dimethyl acrylamide-acrylic acid-4-hydroxybutyl acrylate, methyl acrylate-acrylic acid-4-hydroxybutyl acrylate copolymer, methyl acrylate-4-hydroxybutyl acrylate copolymer, or the like.

The urethane bond-containing crosslinked polymer may have a weight average molecular weight of 100,000-5,000,000. According to an embodiment of the present disclosure, the urethane bond-containing crosslinked polymer may have a weight average molecular weight of 200,000-4,000,000, 200,000-700,000, or 700,000-4,000,000.

When the crosslinked polymer has a weight average molecular weight less than 100,000, it is dissolved in an electrolyte during crosslinking, and thus may not connect and fix the inorganic particles sufficiently, resulting in separation of the porous coating layer from the porous polymer substrate and degradation of the heat shrinkage of the separator. When the crosslinked polymer has a weight average molecular weight larger than 5,000,000, it is difficult to synthesize the crosslinked polymer itself and the yield of the crosslinked polymer may be low.

The crosslinked polymer may be used in an amount of 6-60 parts by weight, based on 100 parts by weight of the total weight of the binder polymer and the crosslinked polymer. According to an embodiment of the present disclosure, the content of the crosslinked polymer may be 9-55 parts by weight, 9.09-54.55 parts by weight, 10-50 parts by weight, or 12-40 parts by weight.

When the content of the crosslinked polymer is less than 6 parts by weight, based on 100 parts by weight of the total weight of the binder polymer and the crosslinked polymer, no effect of crosslinking is realized and the separator shows significantly increased heat shrinkage. When the content of the crosslinked polymer is larger than 60 parts by weight, the porous coating layer shows an excessively increased air permeation time.

The weight ratio of the inorganic particles to the total weight of the binder polymer and the crosslinked polymer may be 50:50-99:1, particularly 70:30-95:5. When the weight ratio of the inorganic particles to the total weight of the binder polymer and the crosslinked polymer satisfies the above-defined range, it is possible to prevent the problem of a decrease in pore size and porosity of the resultant coating layer, caused by an increase in content of the binder polymer and the crosslinked polymer. It is also possible to solve the problem of degradation of peeling resistance of the resultant coating layer, caused by a decrease in content of the binder polymer and the crosslinked polymer.

In the separator according to an embodiment of the present disclosure, the porous coating layer may further include other additives as ingredients thereof, besides the above-described inorganic particles and the polymers.

According to the present disclosure, non-limiting examples of the inorganic particles may include inorganic particles having a dielectric constant of 5 or more, particularly 10 or more, inorganic particles having lithium ion transportability, and a mixture thereof.

Non-limiting examples of the inorganic particles having a dielectric constant of 5 or more may include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3PbTiO_3$(PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, Al(OH), $Al_2O_3H_2O$, or a mixture thereof.

As used herein, the term 'inorganic particles having lithium ion transportability' refers to inorganic particles which contain lithium elements and do not store lithium but transport lithium ions. Non-limiting examples of the inorganic particles having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as LiI—$Li_2S$—$P_2S_5$, or a mixture thereof.

Although there is no particular limitation in the thickness of the porous coating layer, the thickness may be 1-10 μm, or 1.5-6 μm. Also, the porosity of the porous coating layer is not particularly limited, but it may be preferably 35-65%.

According to an embodiment of the present disclosure, the porous coating layer may be an organic coating layer using organic slurry or an aqueous coating layer using aqueous slurry. Particularly, in the case of an aqueous coating layer, it is more advantageous in that thin film coating is facilitated and the resistance of the separator is reduced.

According to an embodiment of the present disclosure, the binder of the porous coating layer attaches the inorganic particles to one another (i.e. the binder interconnects and fixes the inorganic particles) so that they may retain their binding states. In addition, the inorganic particles and the porous polymer substrate are retained in such a manner that they may be bound to each other by the binder. The inorganic particles of the porous coating layer may form interstitial volumes, while they are substantially in contact with one another, wherein the interstitial volumes refer to spaces defined by the inorganic particles that are substantially in contact with one another in a closely packed or densely packed structure of the inorganic particles. The interstitial volumes formed among the inorganic particles may become vacant spaces to form pores.

According to an embodiment of the present disclosure, the separator may have a heat shrinkage of 35% or less, 1-35%, 6-32%, or 6-25%.

Herein, each of the heat shrinkage of the separator before crosslinking and that of the separator (finished separator) after activation can be obtained by preparing a separator specimen having a size of 5 cm×5 cm, storing the specimen at 150° C. for 30 minutes, and calculating the heat shrinkage according to the formula of [((Initial length)−(Length after heat shrinking at 150° C./30 min.))/(Initial length)]×100. The heat shrinkage of the separator after activation may be determined by preparing a crosslinked separator after storing a separator before crosslinking under the same battery activation condition without a step of assembling with electrodes, and calculating the heat shrinkage of the obtained finished crosslinked separator under the same condition as described above.

In another aspect, there is provided a method for manufacturing a secondary battery provided with the separator according to an embodiment of the present disclosure, including the steps of:
  preparing slurry including a plurality of inorganic particles, a binder polymer, a crosslinkable polymer and a dispersion medium;
  applying the slurry onto at least one surface of a porous polymer substrate to prepare a preliminary separator provided with a porous coating layer;
  stacking an electrode including a current collector and an electrode layer disposed on at least one surface of the current collector on the top surface of the porous coating layer of the preliminary separator in such a manner that the electrode layer may face the porous coating layer to prepare a preliminary separator-electrode composite;
  preparing a secondary battery including the preliminary separator-electrode composite; and
  activating the secondary battery so that the crosslinkable polymer of the porous coating layer may be crosslinked to obtain an urethane bond-containing crosslinked polymer.

Hereinafter, each of the steps will be explained in more detail.

First, in order to form a porous coating layer, slurry may be prepared by dissolving a binder polymer and a crosslinkable polymer in a dispersion medium, adding inorganic particles thereto and dispersing them. The inorganic particles may be added after they are pulverized in advance to a predetermined average particle diameter. Otherwise, the inorganic particles may be added to a solution of the binder polymer and the crosslinkable polymer, and then pulverized and dispersed, while controlling them to have a predetermined average particle diameter by using a ball milling process, or the like.

Although there is no particular limitation in the process for coating the slurry for forming a porous coating layer onto the porous polymer substrate, it is preferred to use a slot coating or dip coating process. A slot coating process includes coating slurry supplied through a slot die onto the whole surface of a substrate and is capable of controlling the thickness of a coating layer depending on the flux supplied from a metering pump. In addition, a dip coating process includes dipping a substrate into a tank containing a slurry to carry out coating and is capable of controlling the thickness of a coating layer depending on the concentration of the slurry and the rate of removing the substrate from the tank. Further, in order to control the coating thickness more precisely, it is possible to carry out post-metering through a Mayer bar or the like, after dipping.

Then, the porous polymer substrate coated with the slurry may be dried by using a dryer, such as an oven, thereby forming a porous coating layer on at least one surface of the porous polymer substrate.

Non-limiting examples of the dispersion medium used herein may include any one selected from acetone, tetrahydrofuran, methylene chloride, chloroform, dimethyl formamide, N-methyl-2-pyrrolidone, methyl ethyl ketone, cyclohexane, methanol, ethanol, isopropyl alcohol, propanol and water, or a mixture of two or more of them.

After coating the slurry on the porous polymer substrate, the coated porous polymer substrate may be dried at 90-180° C. or 100-150° C. to remove the dispersion medium.

In this manner, prepared is a preliminary separator including a porous polymer substrate, and a porous coating layer containing a binder polymer, a crosslinkable polymer and inorganic particles and disposed on at least one surface of the porous polymer substrate.

The crosslinkable polymer includes an urethane reactive functional group, such as a hydroxyl group (—OH), isocyanate group (—NCO) or both, and is converted into an urethane bond-containing crosslinked polymer through an urethane crosslinking reaction.

Reference will be made to the above description about the crosslinkable polymer used herein.

The content of the crosslinkable polymer may be 6-60 parts by weight based on 100 parts by weight of the total weight of the binder polymer and the crosslinkable polymer. According to an embodiment of the present disclosure, the content may be 9-55 parts by weight, 10-50 parts by weight, or 12-40 parts by weight.

Then, an electrode including a current collector and an electrode layer disposed on at least one surface of the current collector is stacked on the top surface of the porous coating layer of the preliminary separator, and the electrode layer is allowed to be in contact with the porous coating layer, thereby preparing a preliminary separator-electrode composite.

The preliminary separator-electrode composite is introduced to a battery casing and an electrolyte is injected thereto to prepare a secondary battery.

A non-aqueous electrolyte is injected to the battery casing in which the preliminary separator-electrode composite is received, followed by sealing, and then the sealed preliminary battery may be subjected to an activation step of initially charging the battery in order to activate the electrode active material and to form an SEI film on the electrode surface. In addition, an aging step may be further carried out so that the electrolyte injected before the activation step may infiltrate into the electrode and the separator.

While the electrode active material is activated and an SEI film is formed in the above-described manner, gases may be generated in the battery through the decomposition of the electrolyte, or the like. As mentioned above, according to the related art, such gases generated during the initial charging step may be discharged to the outside of the battery by reopening the battery casing or by cutting a portion of the battery casing.

Herein, during the step of activating a secondary battery, the crosslinkable polymer of the porous coating layer is crosslinked to obtain an urethane bond-containing crosslinked polymer.

The step of activating a secondary battery is an initial charging step for activating the electrode active material and for forming an SEI film on the electrode surface. In addition, an aging step may be further carried out so that the electrolyte injected before the activation step may infiltrate into the electrode and the separator.

According to an embodiment of the present disclosure, the step of activating a secondary battery may include an initial charging step and a high-temperature aging step, or an initial charging step, a room-temperature aging step and a high-temperature aging step.

The initial charging may be carried out at a state of charge (SOC) of 10% or more, 30% or more, or 50% or more. Although the upper limit of SOC is not particularly limited, it may be 100% or 90%. In addition, the initial charging may be carried out with a cut-off voltage of 3.5 V or more, 3.5-4.5 V, or 3.65-4.5 V.

The initial charging may be carried out at a C-rate of 0.05-2 C, or 0.1-2 C.

The high-temperature aging step functions to provide a condition under which the crosslinkable polymer of the porous coating layer may be crosslinked. For example, the high-temperature aging step may be carried out at a temperature of 50° C. or higher, 50-100° C., 60-100° C., or 60-80° C. The high-temperature aging step may be carried out for 0.5-2 days, or 0.5-1.5 days.

In addition, the room temperature-aging step may be added between the initial charging step and the high-temperature aging step, and may be carried out at a temperature of 20-40° C., 23-35° C., 23-30° C., 23-27° C., or 23-25° C. In addition, the room temperature-aging step may be carried out for 1-7 days, or 1-5 days.

According to an embodiment of the present disclosure, the step of activating a secondary battery may be carried out by charging the secondary battery under a constant current (CC) condition of 0.1 C to 3.65 V at SOC 30%, and aging the secondary battery by storing the secondary battery at room temperature (25° C.) for 3 days and storing it at a high temperature of 60° C. for 1 day.

In still another aspect of the present disclosure, there is provided an electrochemical device including a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, 18 parts by weight of polyvinylidene fluoride (PVDF) as a binder polymer, and 1 part by weight of polyvinylidene fluoride-chlorotrifluoroethylene (PVDF-CTFE)-graft-(methyl methacrylate-2-isocyanatoethyl acrylate) and 1 part by weight of ethyl acrylate-acrylonitrile-dimethyl acrylamide-acrylic acid-4-hydroxybutyl acrylate copolymer as crosslinkable polymers were added to 93 parts by weight of acetone as a dispersion medium, and the mixture was agitated at 60° C. for about 3 hours to prepare a binder polymer solution. Next, 78 parts by weight of alumina ($Al_2O_3$) particles having an average particle diameter of 500 nm and 2 parts by weight of cyanoethyl pullulan as a binder polymer were added to 75 parts by weight of acetone and dispersed therein to obtain a dispersion, and then the dispersion was agitated with the binder polymer solution to obtain slurry for a porous coating layer.

The obtained slurry was coated on both surfaces of a polyethylene porous membrane (resistance 0.66 ohm, air permeability 142 sec/100 cc) having a thickness of 9 μm through a dip coating process and dried in an oven at 100° C. to obtain a preliminary separator having porous coating layers on both surfaces thereof. Herein, the total thickness of the porous coating layers was 6 μm.

Then, 96.7 parts by weight of $Li[Ni_{0.6}Mn_{0.2}Co_{0.2}]O_2$ functioning as a cathode active material, 1.3 parts by weight of graphite functioning as a conductive material and 2.0 parts by weight of polyvinylidene fluoride functioning as a binder were mixed to prepare a cathode mixture. The obtained cathode mixture was dispersed in 1-methyl-2-pyrrolidone functioning as a solvent to obtain cathode mixture slurry. The slurry was coated on both surfaces of aluminum foil having a thickness of 20 μm, followed by drying and pressing, to obtain a cathode.

In addition, 97.6 parts by weight of artificial graphite and natural graphite functioning as anode active materials (weight ratio 90:10), and 1.2 parts by weight of styrene-butadiene rubber (SBR) and 1.2 parts by weight of carboxymethyl cellulose (CKC) functioning as binders were mixed to prepare an anode mixture. The anode mixture was dispersed in ion exchange water functioning as a solvent to prepare anode mixture slurry. The slurry was coated on both surfaces of copper foil having a thickness of 20 μm, followed by drying and pressing, to obtain an anode.

After that, $LiPF_6$ was dissolved in an organic solvent containing a mixture of ethylene carbonate (EC), propylene carbonate (PC) and diethyl carbonate (DEC) at a volume ratio of 3:3:4 to a concentration of 1.0 M, thereby providing a non-aqueous electrolyte.

The preliminary separator was interposed between the cathode and the anode in such a manner that at least one layer of the cathode active material layer and the anode active material layer might face the porous coating layer of the preliminary separator, thereby providing a preliminary separator-electrode composite. The preliminary separator-electrode composite was received in a pouch and the electrolyte was injected thereto to obtain a secondary battery.

Then, the secondary battery provided with the preliminary separator was charged under a constant current (CC) condition of 0.1 C to 3.65 V at SOC 30%, and then subjected to an activation step through an aging step of storing it at room temperature (25° C.) for 3 days and at a high temperature of 60° C. for 1 day.

During the activation step, the isocyanate groups and hydroxyl groups of the crosslinkable polymer contained in the porous coating layer of the preliminary separator reacted with each other through addition reaction to perform urethane crosslinking, thereby providing an urethane bond-containing crosslinked polymer.

As a result, a separator for a secondary battery including the urethane bond-containing crosslinked polymer in the porous coating layer, and a secondary battery including the separator were obtained finally.

The content ratio and weight average molecular weight of the crosslinked polymer are shown in the following Table 1.

Herein, the content of the crosslinked polymer was calculated by dissolving the porous coating layer in acetone to separate the inorganic particles and the binder solution layer from each other, and measuring the weight of the polymer (i.e. crosslinked polymer) not dissolved in the binder solution.

In addition, the weight average molecular weight of the crosslinked polymer was determined by using a gel permeation chromatography (GPC) system (Agilent Infinity 1200 system) with THF as a solvent at 1.0 mL/min under the condition of 35° C.

The content ratio and weight average molecular weight of each of the crosslinked polymers according to the following Examples and Comparative Examples were determined and calculated in the same manner as described above.

Example 2

A separator for secondary battery and a secondary battery including the same were obtained in the same manner as Example 1, except that 16 parts by weight of polyvinylidene fluoride (PVDF), 2 parts by weight of cyanoethyl pullulan, 2 parts by weight of polyvinylidene fluoride-chlorotrifluoroethylene (PVDF-CTFE)-graft-(methyl methacrylate-2-isocyanatoethyl acrylate) and 2 parts by weight of ethyl acrylate-acrylonitrile-dimethyl acrylamide-acrylic acid-4-hydroxybutyl acrylate copolymer were used as binder polymers, and the content ratio and weight average molecular weight of the crosslinked polymers were the same as shown in Table 1.

Example 3

A separator for secondary battery and a secondary battery including the same were obtained in the same manner as Example 1, except that 12 parts by weight of polyvinylidene fluoride (PVDF), 2 parts by weight of cyanoethyl pullulan, 4 parts by weight of polyvinylidene fluoride-chlorotrifluoroethylene (PVDF-CTFE)-graft-(methyl methacrylate-2-isocyanatoethyl acrylate) and 4 parts by weight of ethyl acrylate-acrylonitrile-dimethyl acrylamide-acrylic acid-4-hydroxybutyl acrylate copolymer were used as binder polymers, and the content ratio and weight average molecular weight of the crosslinked polymers were the same as shown in Table 1.

Example 4

A separator for secondary battery and a secondary battery including the same were obtained in the same manner as Example 1, except that 8 parts by weight of polyvinylidene fluoride (PVDF), 2 parts by weight of cyanoethyl pullulan, 6 parts by weight of polyvinylidene fluoride-chlorotrifluoroethylene (PVDF-CTFE)-graft-(methyl methacrylate-2-isocyanatoethyl acrylate) and 6 parts by weight of ethyl acrylate-acrylonitrile-dimethyl acrylamide-acrylic acid-4-hydroxybutyl acrylate copolymer were used as binder polymers, and the content ratio and weight average molecular weight of the crosslinked polymers were the same as shown in Table 1.

Example 5

A separator for secondary battery and a secondary battery including the same were obtained in the same manner as Example 1, except that 16 parts by weight of polyvinylidene fluoride (PVDF), 2 parts by weight of cyanoethyl pullulan, 2 parts by weight of polyvinylidene fluoride-chlorotrifluoroethylene (PVDF-CTFE)-graft-(methyl methacrylate-2-isocyanatoethyl acrylate) and 2 parts by weight of ethyl acrylate-acrylonitrile-dimethyl acrylamide-acrylic acid-4-hydroxybutyl acrylate copolymer were used as binder polymers, and the content ratio and weight average molecular weight of the crosslinked polymers were the same as shown in Table 1.

Example 6

A separator for secondary battery and a secondary battery including the same were obtained in the same manner as Example 1, except that 16 parts by weight of polyvinylidene fluoride (PVDF), 2 parts by weight of cyanoethyl pullulan, 2 parts by weight of polyvinylidene fluoride-chlorotrifluoroethylene (PVDF-CTFE)-graft-(methyl methacrylate-2-isocyanatoethyl acrylate) and 2 parts by weight of ethyl acrylate-acrylonitrile-dimethyl acrylamide-acrylic acid-4-hydroxybutyl acrylate copolymer were used as binder polymers, and the content ratio and weight average molecular weight of the crosslinked polymers were the same as shown in Table 1.

Example 7

A separator for secondary battery and a secondary battery including the same were obtained in the same manner as Example 1, except that 18 parts by weight of polyvinylidene fluoride (PVDF), 2 parts by weight of cyanoethyl pullulan, 1 part by weight of polyvinylidene fluoride-chlorotrifluoroethylene (PVDF-CTFE)-graft-(methyl methacrylate-2-isocyanatoethyl acrylate) and 1 part by weight of ethyl acrylate-acrylonitrile-dimethyl acrylamide-acrylic acid-4-hydroxybutyl acrylate copolymer were used as binder polymers, and the content ratio and weight average molecular weight of the crosslinked polymers were the same as shown in Table 1.

Comparative Example 1

A separator for secondary battery and a secondary battery including the same were obtained in the same manner as Example 1, except that 20 parts by weight of polyvinylidene fluoride (PVDF) and 2 parts by weight of cyanoethyl pullulan were used as binder polymers, and no crosslinkable polymer was used.

Comparative Example 2

A separator for secondary battery and a secondary battery including the same were obtained in the same manner as Example 1, except that 19 parts by weight of polyvinylidene fluoride (PVDF), 2 parts by weight of cyanoethyl pullulan, 0.5 parts by weight of polyvinylidene fluoride-chlorotrifluoroethylene (PVDF-CTFE)-graft-(methyl methacrylate-2-isocyanatoethyl acrylate) and 0.5 parts by weight of ethyl acrylate-acrylonitrile-dimethyl acrylamide-acrylic acid-4-hydroxybutyl acrylate copolymer were used as binder polymers, and the content ratio and weight average molecular weight of the crosslinked polymers were the same as shown in Table 1.

Comparative Example 3

A separator for secondary battery and a secondary battery including the same were obtained in the same manner as Example 1, except that 4 parts by weight of polyvinylidene fluoride (PVDF), 2 parts by weight of cyanoethyl pullulan, 8 parts by weight of polyvinylidene fluoride-chlorotrifluoroethylene (PVDF-CTFE)-graft-(methyl methacrylate-2-isocyanatoethyl acrylate) and 8 parts by weight of ethyl acrylate-acrylonitrile-dimethyl acrylamide-acrylic acid-4-hydroxybutyl acrylate copolymer were used as binder polymers, and the content ratio and weight average molecular weight of the crosslinked polymers were the same as shown in Table 1.

Comparative Example 4

A separator for secondary battery and a secondary battery including the same were obtained in the same manner as Example 1, except that 16 parts by weight of polyvinylidene fluoride (PVDF), 2 parts by weight of cyanoethyl pullulan, 2 parts by weight of polyvinylidene fluoride-chlorotrifluoroethylene (PVDF-CTFE)-graft-(methyl methacrylate-2-isocyanatoethyl acrylate) and 2 parts by weight of ethyl acrylate-acrylonitrile-dimethyl acrylamide-acrylic acid-4-hydroxybutyl acrylate copolymer were used as binder polymers, and the content ratio and weight average molecular weight of the crosslinked polymers were the same as shown in Table 1.
Test Results Each of the separators according to Examples 1-7 and Comparative Examples 1~4 was tested in terms of resistance, air permeation time, electrode-separator adhesion (gf/25 mm) and heat shrinkage (before crosslinking, after activation). The results are shown in the following Table 1.

Particularly, each test method is as follows.
(1) Resistance of Separator

Each of the separators according to Examples 1-7 and Comparative Examples 1-4 was impregnated with an electrolyte and resistance was determined. Herein, the resistance of each separator was determined by using 1M $LiPF_6$-ethylene carbonate/ethylmethyl carbonate (weight ratio 3:7) as an electrolyte at 25° C. through an alternating current process.

(2) Air Permeability

The air permeability (Gurley) was determined according to the method of ASTM D726-94. Herein, the Gurley type air permeability refers to resistance against air flow, and was determined by using a Gurley densometer. Each of the air permeability values defined herein is shown as a time (i.e. air permeation time) required for 100 cc of air to pass through a section of 1 $in^2$ of each of the separators according to Examples 1-7 and Comparative Examples 1-4 under a pressure of 12.2 $inH_2O$.

(3) Evaluation of Electrode-Separator Adhesion (Gf/25 mm)

Active materials [natural graphite and artificial graphite (weight ratio 5:5)], a conductive material (super P) and a binder [polyvinylidene fluoride (PVDF)] were mixed at a weight ratio of 92:2:6 and the resultant mixture was dispersed in water. Then, the resultant slurry was coated on copper foil to obtain an anode, and the anode was cut into a size of 25 mm×70 mm.

Each of the separators according to Examples 1-7 and Comparative Examples 1-4 was cut into a size of 25 mm×70 mm.

The obtained separator was laminated with the anode and then the resultant structure was inserted between PET films and adhered thereto by using a flat press. Herein, the flat press was heated at 90° C. under a pressure of 8 MPa.

The end portion of the adhered separator and anode was mounted to an UTM instrument (LLOYD Instrument LF Plus), and force was applied at a rate of 300 mm/min in both directions. The force required for separating the separator from the anode was measured.

(4) Evaluation of Heat Shrinkage

The heat shrinkage of a separator before crosslinking was calculated by preparing a specimen of each separator into a size of 5 cm×5 cm, allowing each specimen to stand at 150° C. for 30 minutes, and then calculating the heat shrinkage according to the formula of Heat Shrinkage (%)=[(Initial length−Length after heat shrinking at 150° C. for 30 minutes)/(Initial length)]×100.

The heat shrinkage of a separator after activation was determined by preparing a crosslinked separator after storing a separator before crosslinking under the same battery activation condition without a step of assembling with electrodes, and then subjecting the obtained finished separator under the same condition as described above. In other words, each of the finished separators was cut into a size of 5 cm×5 cm to prepare a specimen, each specimen was allowed to stand at 150° C. for 30 minutes, and then the heat shrinkage was calculated according to the formula of Heat Shrinkage (%)=[(Initial length−Length after heat shrinking at 150° C. for 30 minutes)/(Initial length]×100.

TABLE 1

| | Ratio of content of crosslinked polymer based on total weight of binder polymer and crosslinked polymer (parts by weight) | | Content ratio of crosslinked polymer (parts by weight, based on 100 parts by weight of total weight of binder polymer and crosslinked polymer) | Weight average molecular weight of crosslinked polymer | Resistance (Ω) | Air permeability (air permeation time) (sec) | Electrode-separator adhesion (gf/25 mm) | Heat shrinkage (%) | |
|---|---|---|---|---|---|---|---|---|---|
| | Binder polymer (parts by weight) | Crosslinked polymer (parts by weight) | | | | | | Before crosslinking | After activation (after crosslinking) |
| Comp. Ex. 1 | 22 | 0 | 0 | — | 0.8 | 620 | 112 | 44 | 56 |
| Comp. Ex. 2 | 21 | 1 | 4.55 | 700,000 | 0.8 | 653 | 50 | 37 | 51 |
| Ex. 1 | 20 | 2 | 9.09 | 700,000 | 0.9 | 757 | 57 | 38 | 32 |
| Ex. 2 | 18 | 4 | 18.18 | 700,000 | 0.9 | 1089 | 84 | 14 | 7 |
| Ex. 3 | 14 | 8 | 36.36 | 700,000 | 0.9 | 1626 | 44 | 14 | 6 |
| Ex. 4 | 10 | 12 | 54.55 | 700,000 | 0.8 | 1685 | 37 | 12 | 9 |
| Comp. Ex. 3 | 6 | 16 | 72.73 | 700,000 | 2 | 5983 | 15 | 10 | 8 |
| Comp Ex. 4 | 18 | 4 | 18.18 | 50,000 | 0.7 | 643 | 90 | 30 | 50 |
| Ex. 5 | 18 | 4 | 18.18 | 20,000 | 0.7 | 752 | 86 | 28 | 20 |
| Ex. 6 | 18 | 4 | 18.18 | 4,000,000 | 1.2 | 1698 | 58 | 10 | 6 |
| Ex. 7 | 20 | 2 | 9.09 | 700,000 | 1.4 | 1930 | 31 | 40 | 35 |

Referring to Table 1, each of the separators, including both a binder polymer and an urethane bond-containing crosslinked polymer in the porous coating layer and satisfying the conditions of a weight average molecular weight of the urethane bond-containing crosslinked polymer of 100,000-5,000,000 and a content of the crosslinked polymer of 6-60 parts by weight based on 100 parts by weight of the total weight of the binder polymer and the crosslinked polymer, according to the according to Examples 1-7 shows excellent electrode-separator adhesion, heat shrinkage after activation (after crosslinking) and air permeation time. It is shown that each of the separators including no crosslinked polymer or including less than 6 parts by weight of a crosslinked polymer according to Comparative Examples 1 and 2 shows an excessively high heat shrinkage, even though it is preferred in terms of air permeation time. The separator including a crosslinked polymer in an amount larger than 60 parts by weight according to Comparative Example 3 shows an excessively larger air permeation time. In addition, the separator including a crosslinked polymer having a weight average molecular weight less than 100,000 according to Comparative Example 4 shows an excessively high heat shrinkage.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A separator for a secondary battery, comprising:
a porous polymer substrate having a plurality of pores; and
a porous coating layer on at least one surface of the porous polymer substrate, the porous coating layer comprising a plurality of inorganic particles, a binder polymer and a urethane bond-containing crosslinked polymer, wherein the binder polymer and the urethane bond-containing crosslinked polymer are on at least a part of a surface of the plurality of inorganic particles to connect and fix the plurality of inorganic particles with one another,
wherein the urethane bond-containing crosslinked polymer has a weight average molecular weight of 100,000 to 5,000,000,
the urethane bond-containing crosslinked polymer is included in an amount of 6 parts by weight to 60 parts by weight based on 100 parts by weight of a total weight of the binder polymer and the urethane bond-containing crosslinked polymer, and
the urethane bond-containing crosslinked polymer is obtained by a crosslinking reaction of at least one crosslinkable polymer during activation of the secondary battery.

2. The separator for the secondary battery according to claim 1, wherein the urethane bond-containing crosslinked polymer has a weight average molecular weight in a range from 200,000 to 4,000,000.

3. The separator for the secondary battery according to claim 1, wherein the urethane bond-containing crosslinked polymer is present in an amount of 9 parts by weight to 55 parts by weight based on 100 parts by weight of the total weight of the binder polymer and the urethane bond-containing crosslinked polymer.

4. The separator for the secondary battery according to claim 1, wherein the separator has a heat shrinkage of 35% or less.

5. The separator for the secondary battery according to claim 1, wherein the porous polymer substrate is a polyolefin-based porous polymer substrate.

6. The separator for the secondary battery according to claim 1, wherein the binder polymer is at least one of polyvinylidene fluoride-co-hexafluoropropylene, polyvinylidene fluoride-co-trichloroethylene, polymethyl methacrylate, polybutyl acrylate, polybutyl methacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, or carboxymethyl cellulose.

7. The separator for the secondary battery according to claim 1, wherein the plurality of inorganic particles are at least one of inorganic particles having a dielectric constant of 5 or more, or inorganic particles having lithium ion transportability.

8. A secondary battery comprising:
a cathode,
an anode, and
a separator interposed between the cathode and the anode, wherein the separator is defined in claim 1.

9. A method for manufacturing a secondary battery having separator as defined in claim 1, comprising the steps of:
preparing a slurry comprising a plurality of inorganic particles, a binder polymer, a crosslinkable polymer and a dispersion medium;
applying the slurry onto at least one surface of a porous polymer substrate to prepare a preliminary separator having a porous coating layer;
stacking an electrode comprising a current collector and an electrode layer on at least one surface of the current collector on a top surface of the porous coating layer of the preliminary separator, wherein the electrode layer faces the porous coating layer, to prepare a preliminary separator-electrode composite;
preparing the secondary battery comprising the preliminary separator-electrode composite; and
activating the secondary battery,
wherein the crosslinkable polymer of the porous coating layer is crosslinked in the step of activating the secondary battery to obtain the urethane bond-containing crosslinked polymer.

10. The method for manufacturing the secondary battery according to claim 9, wherein the crosslinkable polymer comprises at least one of polyvinylidene fluoride-chlorotrifluoroethylene-graft-(methyl methacrylate-2-isocyanatoethyl acrylate), polyvinylidene fluoride-graft-(methyl methacrylate-2-isocyanatoethyl acrylate), polyvinylidene fluoride-chlorotrifluoroethylene-graft-(2-isocyanatoethyl acrylate), polyvinylidene fluoride-graft-(methyl acrylate-2-isocyanatoethyl acrylate), or polyvinylidene fluoride-chlorotrifluoroethylene-graft-(methyl acrylate-2-isocyanatoethyl acrylate); and
at least one of ethyl acrylate-acrylonitrile-dimethyl acrylamide-acrylic acid-4-hydroxybutyl acrylate copolymer, methyl acrylate-acrylonitrile-dimethylacrylamide-acrylic acid-4-hydroxybutyl acrylate copolymer, ethyl acrylate-acrylonitrile-acrylic acid-4-hydroxybutyl acrylate copolymer, ethyl acrylate-acrylonitrile-dimethylacrylamide-4-hydroxybutyl acrylate copolymer, ethyl acrylate-dimethylacrylamide-acrylic acid-4-hydroxybutyl acrylate copolymer, ethyl acrylate-acrylic acid-4-hydroxybutylacrylate copolymer, ethyl acrylate-4-hydroxybutyl acrylate copolymer, methyl acrylate-acrylonitrile-acrylic acid-4-hydroxybutyl acrylate copolymer, methyl acrylate-acrylonitrile-dimethyl acrylamide-4-hydroxybutyl acrylate copolymer, methyl acrylate-dimethyl acrylamide-acrylic acid-4-hydroxybutyl acrylate copolymer, methyl acrylate-acrylic acid-4-hydroxybutyl acrylate copolymer, or methyl acrylate-4-hydroxybutyl acrylate-copolymer.

11. The method for manufacturing the secondary battery according to claim 9, wherein the crosslinkable polymer comprises polyvinylidene fluoride-chlorotrifluoroethylene-graft-(methyl methacrylate-2-isocyanatoethyl acrylate) and ethyl acrylate-acrylonitrile-dimethyl acrylamide-acrylic acid-4-hydroxybutyl acrylate copolymer.

12. The method for manufacturing the secondary battery according to claim 9, wherein the step of activating the secondary battery comprises an initial charging step and a high-temperature aging step.

13. The method for manufacturing the secondary battery according to claim 12, wherein the high-temperature aging step is carried out at a temperature of 50° C. or higher.

14. The method for manufacturing the secondary battery according to claim 12, which further comprises a room temperature-aging step carried out at a temperature of 20° C. to 40° C. between the initial charging step and the high-temperature aging step.

* * * * *